US008856890B2

(12) United States Patent
Vinokurov et al.

(10) Patent No.: US 8,856,890 B2
(45) Date of Patent: Oct. 7, 2014

(54) SYSTEM AND METHOD OF NETWORK ACCESS SECURITY POLICY MANAGEMENT BY USER AND DEVICE

(75) Inventors: Dmitri Vinokurov, Ottawa (CA); Vinod Kumar Choyi, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 2306 days.

(21) Appl. No.: 11/704,354

(22) Filed: Feb. 9, 2007

(65) Prior Publication Data

US 2008/0196088 A1    Aug. 14, 2008

(51) Int. Cl.
*H04L 29/06* (2006.01)
(52) U.S. Cl.
CPC ............ *H04L 63/0263* (2013.01); *H04L 63/20* (2013.01)
USPC .............................................................. 726/5
(58) Field of Classification Search
CPC ...................................................... G06F 21/42
USPC ........... 726/1, 5, 11, 2, 3, 6, 7, 12, 14; 380/33
See application file for complete search history.

(56) References Cited

U.S. PATENT DOCUMENTS

| 2004/0167984 | A1 | 8/2004 | Herrmann |
| 2005/0063400 | A1 | 3/2005 | Lum |
| 2005/0182944 | A1* | 8/2005 | Wagner et al. ................ 713/182 |
| 2006/0294580 | A1 | 12/2006 | Yeh |

FOREIGN PATENT DOCUMENTS

CN              1901475              1/2007

OTHER PUBLICATIONS

Ensuring Security and Compliance Through Policy-Based Network, AEP Networks-White Paper, Sep. 2006.
Office Action for Application No. 200880003990.7 dated Dec. 12, 2011.

* cited by examiner

*Primary Examiner* — Edward Zee
(74) *Attorney, Agent, or Firm* — Kramer Amado, P.C.

(57) ABSTRACT

A system and method are provided for management of access security by user and device. A security policy enforcement point is provided with a user policy module to receive user credentials from an access device of the user and a point for setting device dependent security policy to receive device credentials from the access device. A user policy is retrieved from a user database with use of the user credentials while a device policy is retrieved from a device database with use of the device credentials. The user policy and device policy are combined and used in the SPEP to enforce a user and device based security policy.

12 Claims, 3 Drawing Sheets

SYSTEM AND METHOD OF NETWORK ACCESS SECURITY POLICY MANAGEMENT BY USER AND DEVICE

FIELD OF THE INVENTION

The invention relates to network access security, intrusion prevention and more particularly to policy for network access security and perimeter control.

BACKGROUND OF THE INVENTION

Service providers who provide network access to users typically implement access security for the network by putting in place and managing network access policies. Access security, when configured properly helps to protect both the user devices and the network itself from malicious attacks and abuses.

Various approaches have been taken to implement access security. One is to set common filtering rules for the entire enterprise or operator network. These rules or policies may be specific for the type of traffic, the specific services to be provided, or the user location, but does not take into account the identity of the users in the protected network nor the type of device being used for access. Many current application-aware firewalls and IDS/IPS (intrusion detection system/intrusion prevention system) systems have been developed according to this approach.

A more recent approach to managing security is to set security policy depending upon the identity of the user and/or the user's duties. In a network often there are different roles, functions or privileges assigned to each user. Consequently, it is possible to implement access security such that when a user accesses the network, the user is identified and the policies associated with the assigned role, function or privileges assigned to the user are then used to provide the security appropriate to that user. An example of this type of approach is the use of ACLs (access control lists), for role-based or user-based access controls. An authorized device may be utilized by any one of a number of various users for network access. Each user is subject to the network security policy determined by his or her identity. FIG. 1A illustrates this principle. Network access device 10 may be used to access a network 5 by a first user 20, second user 22, or third user 24, each of which have different identities, and may have different roles or privileges. The access device 10 accesses the network 5 through a security policy enforcement point (SPEP) 21 which typically is a security proxy which controls access and traffic in both directions. FIG. 1B illustrates a single user 20 accessing the network 5 using any one of a number of different access devices 10, 12, and 14 coupled to the network 5 through the SPEP 21. No matter which device 10, 12, 14 the user utilizes to access the network 5, since a single user 20 always maintains the same identity, the same role and the same privileges, the same security policies will be applied. Independent of these security policies, tools such as port-based access control 802.1x or IMEI (international mobile equipment identity) are used for the purposes of identification and/or authentication of the devices when used to access the network.

Despite the current state of security policy enforcement of network access, today's end-user can use any one of a number of different types of devices to connect to the access network. These types of devices include for example laptops, palmtops, tablet personal computers (PCs), personal data assistants (PDAs), and desktop computers. Each of these devices could have uniquely different hardware and software configurations and could have different versions of software applications and even operating systems installed on them. Therefore, each of the devices may be potentially vulnerable to specific exploits and attacks. The performance capabilities of these different devices may also be quite different from each other.

A network which provides support for robust user mobility ideally provides for end-user access to the network using any device and ideally would provide for dynamically providing security to a user's access when the user changes access device while maintaining the same user identity registered on the security policy enforcement point.

Known approaches to access security management do not address the situation when the end-user dynamically changes the device within the same premises under the same identity; for instance switches between different operating systems or between a PDA and a PC as a subscriber within the rich presence concept framework. Current systems which do not track these device changes remain unaware of them from a security policy perspective. Generic rules and policies or those based on the user's identity and his credentials of known systems do not provide an appropriate level of security according to the distinctive characteristics of the various devices or their configuration. For example, firewall/filtering rules even when being specific per user's identity (and corresponding credentials) do not take into account the type of the end-device that is used; instead they are based on the assumption that the devices are permanently of the same kind typical for the given network segment (for example desktop computers). As a result, an event, traffic or an end-user's action which is harmless in the conditions when the first device is used, can potentially be destructive for the other device or for the service, if not prevented by the security controls in the network. One example of this is the difference between a server (for example a PC) and a small portable network capable device (for example a PDA). The PC is quite capable to receive a large number of SYN packets per second while the PDA would be overwhelmed by the same traffic which the PC could easily deal with. A PDA security policy could set a limit to the number of SYN packets received per second which is much lower than the limit of SYN packets received per second in a PC security policy for a PC.

SUMMARY OF THE INVENTION

According to one broad aspect the invention provides for a system for user-device access security policy management, the system comprising: an access device having corresponding device credentials; and a security policy enforcement point for receiving from said access device user credentials and said device credentials, for retrieving a user security policy with use of said user credentials, for retrieving a device security policy with use of said device credentials, for generating a user-device security policy with use of said user security policy and said device security policy, and for enforcing said user-device security policy.

In some embodiments of the invention the device credentials comprise a device indicator which comprises at least one of a device type, a device model, a device configuration, and a device class.

In some embodiments of the invention said user credentials are transmitted over a first information channel from said access device to said security policy enforcement manager, and wherein said device credentials are transmitted over a second information channel from said access device to said security policy enforcement manager.

In some embodiments of the invention the security policy enforcement point further comprises: a user policy module for retrieving said user security policy from a user database, and a PSDDSP (point for setting device dependent security policy) for retrieving said device security policy from a device database.

In some embodiments of the invention said user database comprises a user record corresponding to said user credentials, said user record comprising information pertaining to said user security policy, and wherein said device database comprises a device record corresponding to said device credentials, said device record comprising information pertaining to said device security policy.

In some embodiments of the invention said user-device security policy is generated by combining user security rules of said user security policy with device security rules of said device security policy.

In some embodiments of the invention said combining comprises adding said user security rules to said device security rules to form a set of user-device rules of said user-device policy.

According to another broad aspect, the invention provides for a method for user-device access security policy management, the method comprising: transmitting from an access device user credentials and device credentials; receiving at a security policy enforcement point from said access device said user credentials said device credentials; retrieving a user security policy with use of said user credentials; retrieving a device security policy with use of said device credentials; generating a user-device security policy with use of said user security policy and said device security policy; and enforcing said user-device security policy.

In some embodiments of the invention the device credentials comprise a device indicator comprising at least one of a device type, a device model, a device configuration, and a device class.

In some embodiments of the invention said user credentials are transmitted over a first information channel from said access device to said security policy enforcement manager, and wherein said device credentials are transmitted over a second information channel from said access device to said security policy enforcement manager.

In some embodiments of the invention said retrieving of said user security policy comprises retrieving by a user policy module said user security policy from a user database, and wherein said retrieving of said device policy comprises retrieving by a PSDDSP (point for setting device dependent security policy) said device security policy from a device database.

In some embodiments of the invention said user database comprises a user record corresponding to said user credentials, said user record comprising information pertaining to said user security policy, and wherein said device database comprises a device record corresponding to said device credentials, said device record comprising information pertaining to said device security policy.

In some embodiments of the invention generating said user-device security policy comprises combining user security rules of said user security policy with device security rules of said device security policy.

In some embodiments of the invention said step of combining comprises adding said user security rules to said device security rules to form a set of user-device rules of said user-device policy.

BRIEF DESCRIPTION OF THE DRAWINGS

The features and advantages of the invention will become more apparent from the following detailed description of the preferred embodiments with reference to the attached figures, wherein.

It is noted that in the attached figures, like features bear similar labels.

DETAILED DESCRIPTION OF THE PREFERRED EMBODIMENTS

A system for network access security policy management by user and device according to the preferred embodiment is now described with reference to FIG. 2. This policy management mechanism allows for dynamic moving from one user's access device to another, making the appropriate changes in security policy appropriate to each device, while allowing the user to remain under the same identity.

Supporting dynamic changes in the user's access device requires dynamic application of policies of various security mechanisms (for example filtering rules, access control, intrusion detection criteria, traffic management) in the access network which take into account the characteristics of the access devices. These characteristics may include performance capabilities, installed software, associated hardware, operating systems and protocols, and the specific vulnerabilities inherent to that particular type of device. Dynamic security policy is also needed when the user switches between access devices which have very different capabilities, for example, when a user switches between using a PC and a PDA to access the network.

Figure 1A:
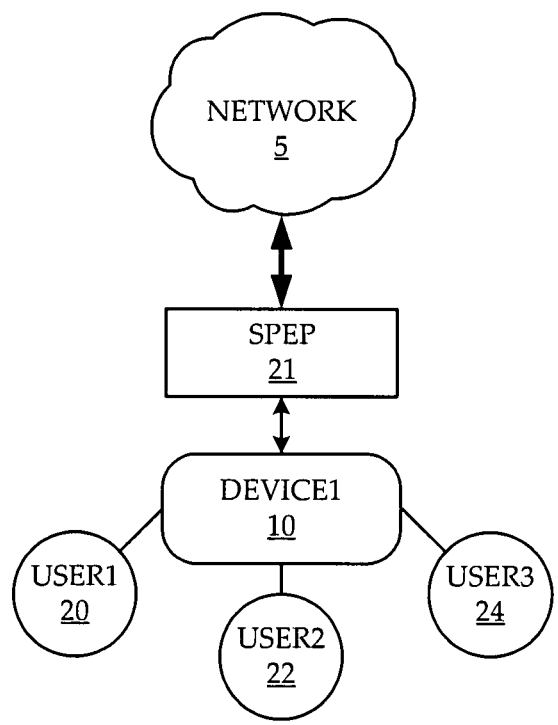
FIG. 1A is a block diagram illustrating an example of known network access through a single device by any one of a multitude of users.
Figure 1B:
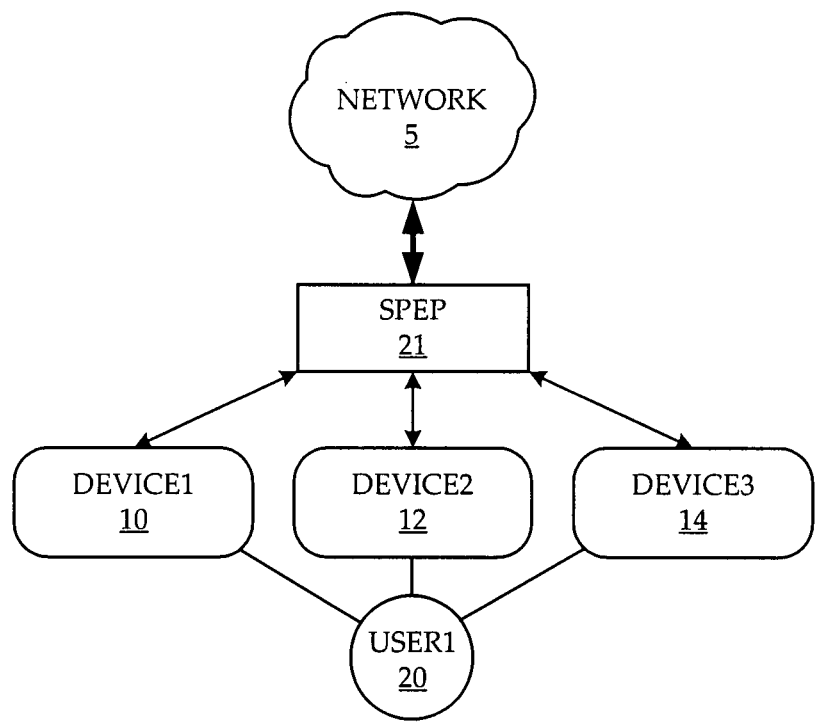
FIG. 1B is a block diagram illustrating an example of known network access through by a single user through any one of a multitude of devices.
Figure 2:
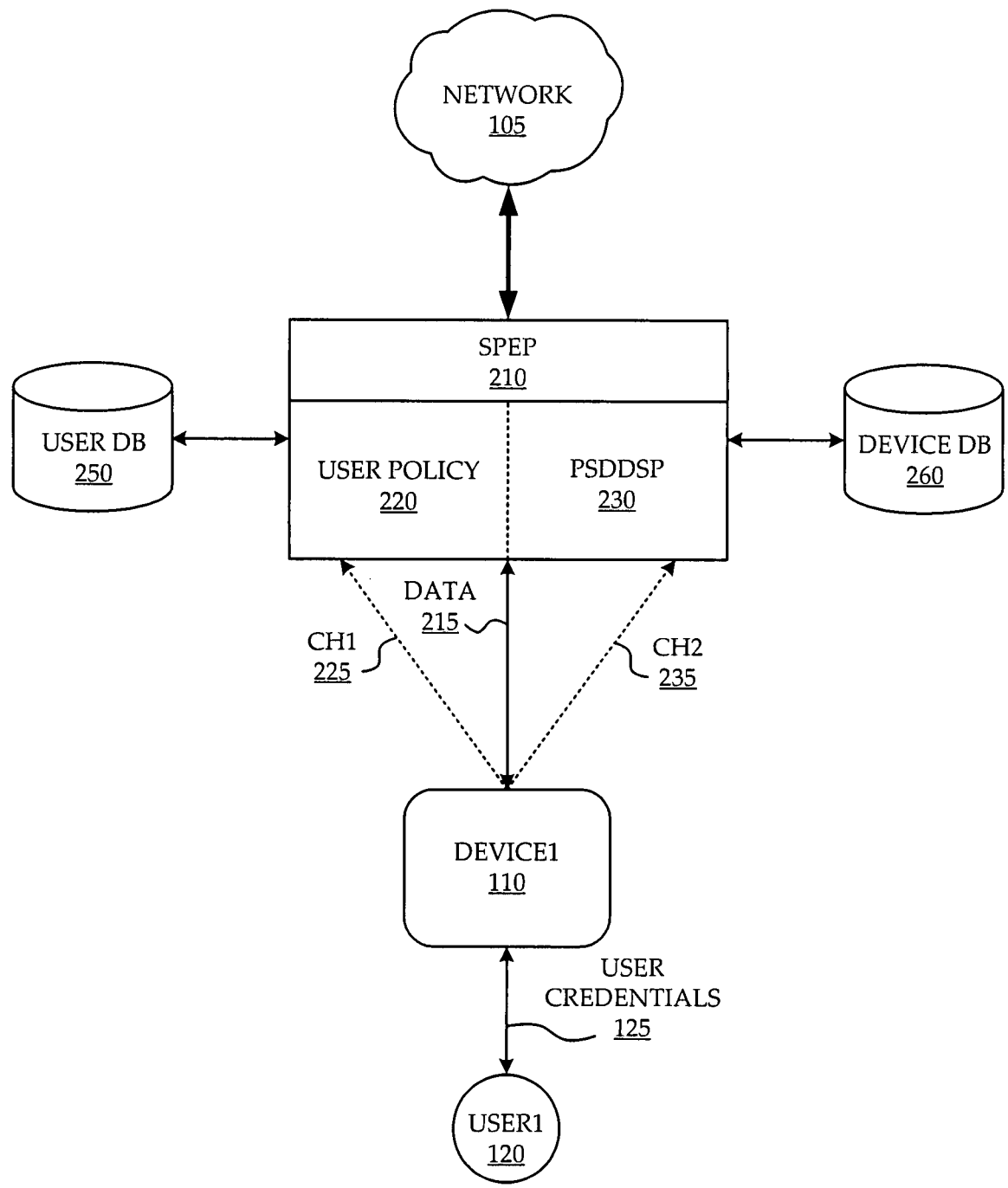
FIG. 2 is a block diagram illustrating network access security policy management by user and device according to a preferred embodiment of the invention.

The system for network access security policy management by user and device as shown in FIG. 2 will now be described in terms of its structure. A user 120 uses an access device 110 to access a network 105. The access device 110 is coupled through a security policy enforcement point (SPEP) 210 to the network 105. The SPEP 210, which could be a firewall, IDS (intrusion detection system), SBC (session border controller), or any other kind of security proxy, controls access and traffic in both directions. The security policy enforcement point 210 has an associated user policy module 220 and a PSDDSP (point for setting device dependent security policy) 230. In the traffic between the security policy enforcement point 210 and the device 110, are a first information channel 225, a data channel 215, and a second information channel 235. Both the first information channel 225 and the second information channel 235 are secure channels of communication from the access device 110 to the SPEP 210. The user policy module 220 has access to a user database 250 while the PSDDSP 230 has access to a device database 260.

The system for network access security policy management by user and device as shown in FIG. 2 will now be described in terms of its function. The user 120 accesses the network 105 through the access device 110. User credentials 125 are then forwarded to the SPEP 210 over the first information channel 225. The SPEP 210 analyses the user credentials 125 received over the first information channel 225. The SPEP employs the user policy module 220 to determine a user security policy for user access through the SPEP 210. The policy module 220 accesses the user database 250 to authenticate the user credentials and to look up the identity, roles, and/or services associated with user security rules of the user security policy to be imposed upon the user's access to the network 105.

The access device 110 communicates the device credentials to the SPEP 210 over the second information channel 235. The device credentials include a device indicator which indicates the type, model, configuration or class of the access device. The PSDDSP 230 of the SPEP 210 uses the device credentials to search the device database 260. The device database 260 contains a record for each defined device type, device model, device configuration and device class. Each record in the database contains security policy considerations or device security rules to be used when access is requested through that type, model, configuration, or class of device including the security parameters (limits, thresholds, signatures, and so on), risks, and vulnerabilities inherent to the particular type, model, configuration, or class of device the record corresponds to. The device database 260 may be remote or local to the SPEP 210.

After retrieving the information contained in the record corresponding to the access device type, model, configuration, or class, the PSDDSP 230 then forms requirements for a device policy, and enforces adjustment of the security controls of the SPEP 210 for that session involving the access device 110. These adjustments to the enforced security policy are determined by the controls or device security rules retrieved from the device database 260 and could include limiting the incoming traffic by rate or by type, looking for attack signatures, setting alarm thresholds, and other controls specific to the access device 110. The security policy resulting from making these modifications to the security policy in the SPEP 210 is referred to as a user-device security policy. The user and device policies are preferably combined simply through the addition of the user security rules associated with the user security policy to the device security rules associated with the device security policy. The PSDDSP 230 and the SPEP 210 could use a protocol such as the MIDCOM Framework to communicate and enforce the user-device security policy.

Once the user-device security policy has been established for the communication session, it is imposed on the traffic traversing the data channel 215 between the access device 110 and the network 105.

The modifications made by the PSDDSP 230 are especially useful in a case where a combination of user and device changes to a combination of a different device and the same user. The embodiment depicted in FIG. 2 fully contemplates the dynamic situation in which the user can switch between different devices under the same user credentials. An example context for this kind of dynamic access is user access in what is known as a rich presence framework. In a rich presence framework, a rich presence server registers each device and tracks and coordinates the device's state and usage, in which a user often changes the access device used.

In some embodiments the security policy does not include any detailed user dependent security policy but instead utilizes the PSDDSP 230 to modify a generic or common set of security policies to take into account the device dependent security policy considerations based on the device credentials provided. This typically would still be associated with authentication of the user.

Figure 3:
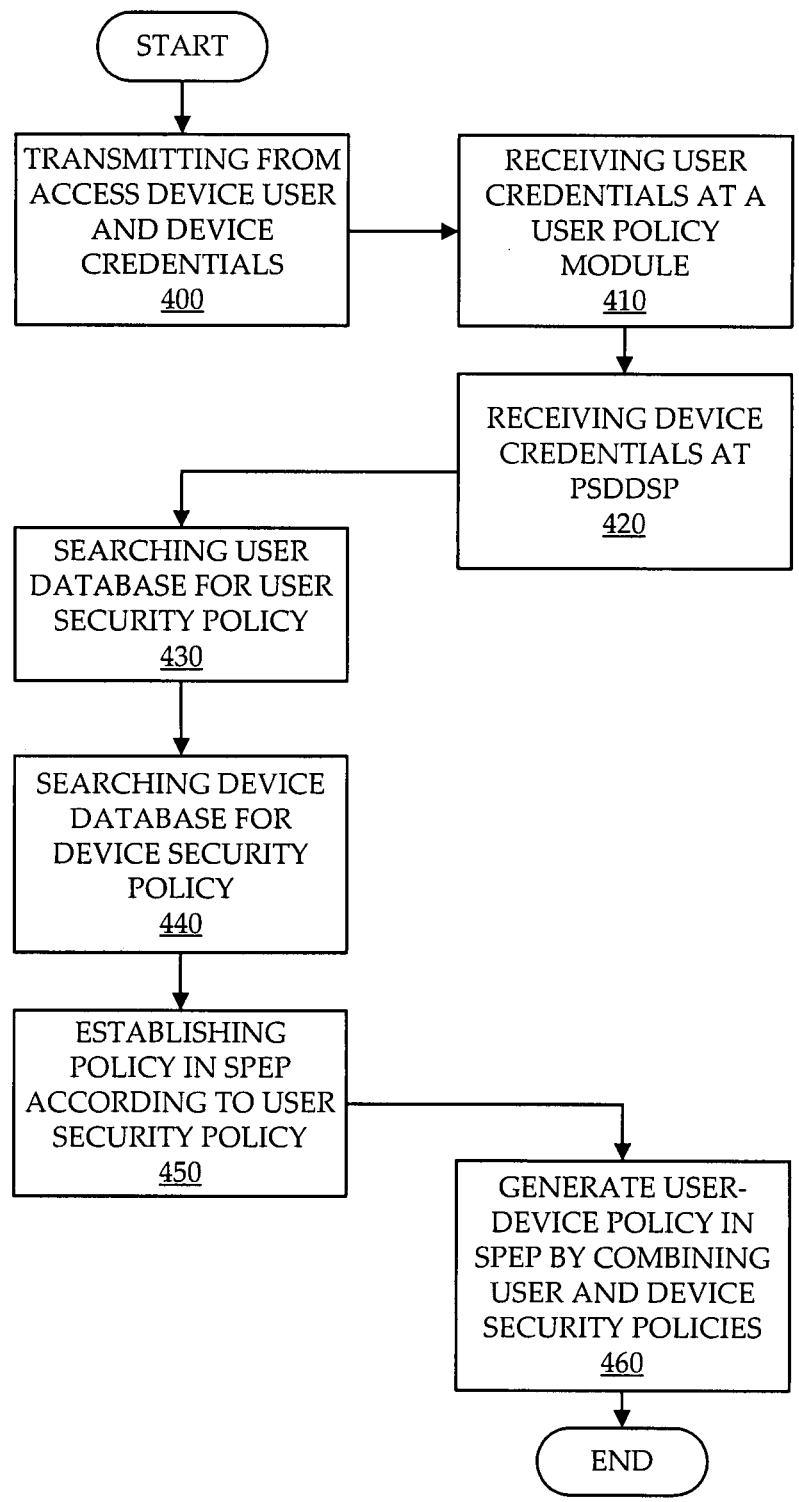
FIG. 3 is a block diagram illustrating a method for network access security policy management by user and device according to a preferred embodiment of the invention.

A method for network access security policy management by user and device according to the preferred embodiment is now described with reference to FIG. 3. At step 400, after a user has inputted his or her user credentials into an access device, the access device when it starts the session transmits the user and device credentials to the SPEP. At step 410 the user policy module of the SPEP receives the user credentials, while at step 420 the PSDDSP (point for setting device dependent security policy) receives the device credentials. At step 430 the user policy module searches the user database for the user security policy corresponding to that user, while at step 440 the PSDDSP searches the device database for the device security policy corresponding to the access device. At step 450 the SPEP sets the security policy according to the user security policy and then at step 460 the SPEP modifies the security policy to include the device security policy generating the user-device security policy. The user and device policies are preferably combined simply through the addition of the user security rules associated with the user security policy to the device security rules associated with the device security policy. Once the user-device security policy is in place, the SPEP can perform its function to enforce security which takes into account both the user policy and the device policy. In an exemplary embodiment the policies are enforced in sequence, in which the user security policy is enforced first and the device security policy is enforced last.

This method of network access security policy management may occur when the user switches from one device to another, in which case the network communication session may be kept alive and transferred smoothly from an old access device to a new access device. One example of this is packet tunneling from an old device to a new device which takes place in an IP mobility framework. In such a case, session transfer triggers the new access device's communication with PSDDSP.

It should be understood that in this method steps 410 and 420 could be performed in the opposite order as well as steps 430 and 440.

The embodiments presented are exemplary only and persons skilled in the art would appreciate that variations to the embodiments described above may be made without departing from the spirit of the invention. The scope of the invention is solely defined by the appended claims.

We claim:

1. A system for user-device access security policy management, the system comprising:
a security policy enforcement manager that is configured to receive, from an access device, user credentials over a first information channel, to receive, from the access device, device credentials over a second information channel, to retrieve a user security policy with use of said user credentials, to retrieve a device security policy with use of said device credentials, to generate a user-device security policy with use of said user security policy and said device security policy, and to enforce said user-device security policy, wherein a user is able to switch between different devices under the same user credentials by using different device credentials.

2. The system of claim 1, wherein the device credentials comprise a device indicator which comprises at least one of a device type, a device model, a device configuration, and a device class.

3. The system of claim 2, wherein the security policy enforcement manager further comprises:

a user policy module for retrieving said user security policy from a user database, and a Point for Setting Device Dependent Security Policy (PS-DDSP) for retrieving said device security policy from a device database.

4. The system of claim 3, wherein said user database comprises a user record corresponding to said user credentials, said user record comprising information pertaining to said user security policy, and wherein said device database comprises a device record corresponding to said device credentials, said device record comprising information pertaining to said device security policy.

5. The system of claim 1, wherein said user-device security policy is generated by combining user security rules of said user security policy with device security rules of said device security policy.

6. The system of claim 5, wherein said combining comprises adding said user security rules to said device security rules to form a set of user-device rules of said user-device policy.

7. A method for user-device access security policy management, the method comprising:
   receiving, at a security policy enforcement manager from an access device, user credentials over a first information channel;
   receiving, at the security policy enforcement manager from the access device, device credentials over a second information channel;
   retrieving a user security policy with use of said user credentials;
   retrieving a device security policy with use of said device credentials;
   generating a user-device security policy with use of said user security policy and said device security policy; and
   enforcing said user-device security policy, wherein a user is able to switch between different devices under the same user credentials by using different device credentials.

8. The method of claim 7, wherein the device credentials comprise a device indicator comprising at least one of a device type, a device model, a device configuration, and a device class.

9. The method of claim 8, wherein said retrieving of said user security policy further comprises:
   retrieving by a user policy module said user security policy from a user database, and wherein said retrieving of said device policy further comprises:
   retrieving, by a Point for Setting Device Dependent Security Policy (PSDDSP), said device security policy from a device database.

10. The method of claim 9, wherein said user database comprises a user record corresponding to said user credentials, said user record comprising information pertaining to said user security policy, and wherein said device database comprises a device record corresponding to said device credentials, said device record comprising information pertaining to said device security policy.

11. The method of claim 7, wherein generating said user-device security policy further comprises:
   combining user security rules of said user security policy with device security rules of said device security policy.

12. The method of claim 11, wherein said step of combining further comprises:
   adding said user security rules to said device security rules to form a set of user-device rules of said user-device policy.

* * * * *